(12) United States Patent
Hull et al.

(10) Patent No.: US 7,884,955 B2
(45) Date of Patent: Feb. 8, 2011

(54) TECHNIQUES FOR PERFORMING ACTIONS BASED UPON PHYSICAL LOCATIONS OF PAPER DOCUMENTS

(75) Inventors: Jonathan J. Hull, San Carlos, CA (US); Jamey Graham, San Jose, CA (US); Dar-Shyang Lee, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 898 days.

(21) Appl. No.: 10/235,028

(22) Filed: Sep. 3, 2002

(65) Prior Publication Data

US 2004/0079796 A1 Apr. 29, 2004

(51) Int. Cl.
G06F 3/12 (2006.01)
G06K 15/00 (2006.01)

(52) U.S. Cl. ............. 358/1.15; 358/1.12; 358/1.16

(58) Field of Classification Search ............. 340/572.1, 340/10.6, 10.42, 572.4; 235/385; 382/306; 358/405, 442
See application file for complete search history.

(56) References Cited

U.S. PATENT DOCUMENTS

| | | | |
|---|---|---|---|
| 4,862,160 A | 8/1989 | Ekchian et al. | |
| 5,287,414 A | 2/1994 | Foster | |
| 5,666,490 A | 9/1997 | Gillings et al. | |
| 5,689,238 A | 11/1997 | Cannon, Jr. et al. | |
| 5,706,452 A | 1/1998 | Ivanov | |
| 5,732,401 A | 3/1998 | Conway | |
| 5,926,116 A * | 7/1999 | Kitano et al. ............. | 340/988 |
| 5,933,829 A | 8/1999 | Durst et al. | |
| 5,936,527 A | 8/1999 | Isaacman et al. | |
| 5,939,981 A | 8/1999 | Renney | |
| 5,942,987 A * | 8/1999 | Heinrich et al. .......... | 340/10.42 |
| 5,974,202 A * | 10/1999 | Wang et al. ............. | 382/306 |
| 5,978,477 A | 11/1999 | Hull et al. | |
| 5,978,773 A | 11/1999 | Hudetz et al. | |
| 6,008,727 A | 12/1999 | Want et al. | |
| 6,055,544 A | 4/2000 | DeRose et al. | |
| 6,100,804 A | 8/2000 | Brady et al. | |

(Continued)

FOREIGN PATENT DOCUMENTS

CA 2354464 7/2003

(Continued)

OTHER PUBLICATIONS

WC3®, "URIs, URLs, and URNs: Clarifications and Recommendations 1.0, Report from the joint W3C/IETF URI Planning Interest Group," downloaded from http://www.w3.org/TR/uri-clarification/ on Jun. 9, 2005.

(Continued)

Primary Examiner—Edward L Coles
Assistant Examiner—Vincent Rudolph
(74) Attorney, Agent, or Firm—Townsend and Townsend and Crew LLP

(57) ABSTRACT

Techniques for performing one or more actions based upon physical locations of one or more paper documents. According to an embodiment of the present invention, the paper documents have identification tags physically associated with them. The physical locations of the paper documents are determined based upon information read from the identification tags physically associated with the paper documents. One or more actions are performed based upon the physical locations of the paper documents.

39 Claims, 4 Drawing Sheets

U.S. PATENT DOCUMENTS

| | | | |
|---|---|---|---|
| 6,104,834 A | 8/2000 | Hull | |
| 6,108,656 A | 8/2000 | Durst et al. | |
| 6,122,520 A | 9/2000 | Want et al. | |
| 6,127,928 A | 10/2000 | Issacman et al. | |
| 6,130,621 A | 10/2000 | Weiss | |
| 6,176,425 B1 | 1/2001 | Harrison et al. | |
| 6,195,006 B1 | 2/2001 | Bowers | |
| 6,199,048 B1 | 3/2001 | Hudetz et al. | |
| 6,204,764 B1 | 3/2001 | Maloney | |
| 6,232,870 B1 | 5/2001 | Garber et al. | |
| 6,249,226 B1 | 6/2001 | Harrison et al. | |
| 6,259,367 B1 | 7/2001 | Klein | |
| 6,260,049 B1 | 7/2001 | Fitzgerald et al. | |
| 6,262,662 B1 | 7/2001 | Back et al. | |
| 6,278,413 B1 | 8/2001 | Hugh et al. | |
| 6,294,998 B1 | 9/2001 | Adams et al. | |
| 6,297,737 B1 | 10/2001 | Irvin | |
| 6,304,182 B1 | 10/2001 | Mori et al. | |
| 6,307,473 B1 | 10/2001 | Zampini et al. | |
| 6,324,353 B1 | 11/2001 | Laussermair et al. | |
| 6,326,889 B1 | 12/2001 | Van Horn et al. | |
| 6,333,690 B1 | 12/2001 | Nelson et al. | |
| 6,335,685 B1 | 1/2002 | Schrott et al. | |
| 6,337,619 B1 | 1/2002 | Kowalski et al. | |
| 6,340,931 B1 | 1/2002 | Harrison et al. | |
| 6,341,931 B1* | 1/2002 | Bates | 414/331.04 |
| 6,354,493 B1 | 3/2002 | Mon | |
| 6,359,628 B1 | 3/2002 | Buytaert | |
| 6,380,894 B1 | 4/2002 | Boyd et al. | |
| 6,427,032 B1* | 7/2002 | Irons et al. | 382/306 |
| 6,430,554 B1 | 8/2002 | Rothschild | |
| 6,434,561 B1 | 8/2002 | Durst, Jr. et al. | |
| 6,442,563 B1 | 8/2002 | Bacon et al. | |
| 6,512,919 B2* | 1/2003 | Ogasawara | 455/422.1 |
| 6,539,281 B2 | 3/2003 | Wan et al. | |
| 6,542,933 B1 | 4/2003 | Durst, Jr. et al. | |
| 6,600,418 B2* | 7/2003 | Francis et al. | 340/572.1 |
| 6,651,053 B1 | 11/2003 | Rothschild | |
| 6,651,063 B1 | 11/2003 | Vorobiev | |
| 6,655,586 B1 | 12/2003 | Back et al. | |
| 6,675,165 B1 | 1/2004 | Rothschild | |
| 6,707,381 B1 | 3/2004 | Maloney | |
| 6,766,363 B1 | 7/2004 | Rothschild | |
| 6,801,907 B1 | 10/2004 | Zagami | |
| 6,825,753 B2 | 11/2004 | Cardinale | |
| 6,860,422 B2 | 3/2005 | Hull et al. | |
| 6,865,608 B2 | 3/2005 | Hunter | |
| 6,892,376 B2 | 5/2005 | McDonald et al. | |
| 6,993,573 B2 | 1/2006 | Hunter | |
| 7,006,664 B2 | 2/2006 | Paraskevakos | |
| 7,129,840 B2 | 10/2006 | Hull et al. | |
| 7,357,300 B2 | 4/2008 | Hull et al. | |
| 7,424,974 B2 | 9/2008 | Hull et al. | |
| 7,506,250 B2 | 3/2009 | Hull et al. | |
| 7,652,555 B2 | 1/2010 | Hull et al. | |
| 2001/0047381 A1* | 11/2001 | Meno et al. | 709/101 |
| 2002/0032698 A1 | 3/2002 | Cox | |
| 2002/0032707 A1 | 3/2002 | Takeoka | |
| 2002/0113707 A1 | 8/2002 | Grunes | |
| 2002/0147649 A1* | 10/2002 | White | 705/20 |
| 2002/0176116 A1* | 11/2002 | Rhoads et al. | 358/405 |
| 2003/0018669 A1 | 1/2003 | Kraft | |
| 2003/0102970 A1 | 6/2003 | Creel et al. | |
| 2003/0179908 A1 | 9/2003 | Mahoney et al. | |
| 2003/0191719 A1 | 10/2003 | Ginter et al. | |
| 2003/0214388 A1 | 11/2003 | Stuart et al. | |
| 2004/0017313 A1 | 1/2004 | Menache | |
| 2004/0041696 A1 | 3/2004 | Hull et al. | |
| 2004/0041707 A1 | 3/2004 | Hull et al. | |
| 2004/0044956 A1* | 3/2004 | Huang | 715/511 |
| 2004/0078749 A1 | 4/2004 | Hull et al. | |
| 2004/0181756 A1 | 9/2004 | Berringer et al. | |
| 2004/0205455 A1 | 10/2004 | Dathathraya | |
| 2004/0257231 A1 | 12/2004 | Grunes et al. | |
| 2005/0035862 A1 | 2/2005 | Wildman | |
| 2005/0105724 A1 | 5/2005 | Hull et al. | |
| 2005/0182757 A1 | 8/2005 | Hull et al. | |

FOREIGN PATENT DOCUMENTS

| | | |
|---|---|---|
| DE | 19646153 A1 | 5/1998 |
| EP | 794 507 B1 | 4/2004 |
| FR | 2782703 A1 | 3/2000 |
| JP | 08-050598 A | 2/1996 |
| JP | 08-101980 | 4/1996 |
| JP | 10-013642 A | 1/1998 |
| JP | 10-154229 A | 6/1998 |
| JP | 2001/052054 A | 2/2001 |
| JP | 2001/253517 A | 9/2001 |
| JP | 2002/046821 A | 2/2002 |
| JP | 2002-120475 A | 4/2002 |
| JP | 2002-522999 | 7/2002 |
| JP | 2002337426 | 11/2002 |
| JP | 4256748 B2 | 4/2009 |
| WO | WO 00/26856 A2 | 5/2000 |

OTHER PUBLICATIONS

"Hitachi Announces world's smallest RFID IC, the 'mu-chip,'" company press release, Hitachi Ltd. Tokyo, Japan (2001).

"Workflow Management Coalition Workflow Standard-Interoperability Wf-XML Binding," The Workflow Management Coalition Specification, May 1, 2000, Version 1.0, Copyright 1999, 2000 The Workflow Management Coalition, pp. 4-40 (2000).

Allen "Workflow: An Introduction," *Workflow Handbook*, Workflow Management Coalition, pp. 15-38 (2001).

Kwon "Tiny Bay Area Invention Could Change Security," on-line article available at http://www.kpix.com, KPIX Channel 5, San Francisco, CA 94111-1597 (2001).

Want et al. "Bridging Physical and Virtual Worlds with Electronic Tags," In Proc. ACM CHI '99 pp. 370-377 (1999).

Want et al. "Expanding the Horizons of Location-Aware Computing," IEEE Computer 34:31-34 (2001).

Want et al. "Ubiquitous Electronic Tagging," IEEE Distributed Systems Online 1:1-6 (2000).

Web pages from PaperClick.com printed from http://www.paperclip.com on Jun. 14, 2006.

Non-Final Office Action for U.S. Appl. No. 10/235,035, mailed on Mar. 13, 2006, 18 pages.

Notice of Allowance for U.S. Appl. No. 10/235,035, mailed on Aug. 28, 2006, 17 pages.

Notice of Allowance for U.S. Appl. No. 10/235,035, mailed on Dec. 8, 2006, 11 pages.

Non-Final Office Action for U.S. Appl. No. 10/235,035, mailed on Jun. 1, 2007, 13 pages.

Notice of Allowance for U.S. Appl. No. 10/235,035, mailed on Dec. 17, 2007, 9 pages.

Notice of Allowance for U.S. Appl. No. 10/235,035, mailed on Apr. 11, 2008, 10 pages.

Non-Final Office Action for U.S. Appl. No. 10/235,042, mailed on Jun. 23, 2005, 23 pages.

Final Office Action for U.S. Appl. No. 10/235,042, mailed on Mar. 8, 2006, 20 pages.

Interview Summary for U.S. Appl. No. 10/235,042, mailed on May 9, 2006. 9 pages.

Advisory Action for U.S. Appl. No. 10/235,042, mailed on Jun. 23, 2006, 4 pages.

Non-Final Office Action for U.S. Appl. No. 10/235,042, mailed on Nov. 7, 2006, 25 pages.

Final Office Action for U.S. Appl. No. 10/235,042, mailed on Jun. 15, 2007, 9 pages.

Final Office Action for U.S. Appl. No. 10/235,042, mailed on Oct. 18, 2007, 8 pages.

Notice of Allowance for U.S. Appl. No. 10/235,042, mailed on Nov. 30, 2007, 6 pages.

Notice of Allowance for U.S. Appl. No. 10/235,042, mailed on Jan. 8, 2009, 6 pages.
Non-Final Office Action for U.S. Appl. No. 10/235,032, mailed on Oct. 6, 2004, 18 pages.
Non-Final Office Action for U.S. Appl. No. 10/235,032, mailed on Jul. 5, 2005, 20 pages.
Final Office Action for U.S. Appl. No. 10/235,032, mailed on Mar. 22, 2006, 23 pages.
Non-Final Office Action for U.S. Appl. No. 10/235,032, mailed on Jul. 12, 2006, 25 pages.
Final Office Action for U.S. Appl. No. 10/235,032, mailed on Dec. 29, 2006, 23 pages.
Non-Final Office Action for U.S. Appl. No. 10/235,032, mailed on Aug. 9, 2007, 19 pages.
Interview Summary for U.S. Appl. No. 10/235,032, mailed on Feb. 21, 2008, 3 pages.
Non-Final Office Action for U.S. Appl. No. 10/235,032, mailed on Feb. 21, 2008, 17 pages.
Non-Final Office Action for U.S. Appl. No. 10/235,032, mailed on Sep. 17, 2008, 17 pages.
Final Office Action for U.S. Appl. No. 10/235,032, mailed on Apr. 28, 2009, 7 pages.
Notice of Allowance for U.S. Appl. No. 10/235,030, mailed on Aug. 15, 2006, 26 pages.
Interview Summary for U.S. Appl. No. 10/235,030, mailed on Aug. 15, 2006, 1 page.
Non-Final Office Action for U.S. Appl. No. 10/234,414, mailed on Dec. 8, 2003, 13 pages.
Notice of Allowance for U.S. Appl. No. 10/234,414, mailed on Jun. 21, 2004, 11 pages.
Notice of Allowance for U.S. Appl. No. 10/234,414, mailed on Sep. 23, 2004, 9 pages.
Requirement for Restriction/Election for U.S. Appl. No. 10/996,805, mailed on Jan. 24, 2006, 4 pages.
Non-Final Office Action for U.S. Appl. No. 10/996,805, mailed on Jun. 7, 2006, 16 pages.
Non-Final Office Action for U.S. Appl. No. 10/996,805, mailed on Jan. 19, 2007, 14 pages.
Final Office Action for U.S. Appl. No. 10/996,805, mailed on Aug. 21, 2007, 11 pages.
Notice of Allowance for U.S. Appl. No. 10/996,805, mailed on Nov. 26, 2007, 12 pages.
Notice of Allowance for U.S. Appl. No. 10/235,032, mailed on Oct. 2, 2009, 26 pages.

* cited by examiner

TECHNIQUES FOR PERFORMING ACTIONS BASED UPON PHYSICAL LOCATIONS OF PAPER DOCUMENTS

CROSS-REFERENCES TO RELATED APPLICATIONS

This application incorporates by reference the entire contents of the following applications and patents for all purposes:

(1) U.S. patent application Ser. No. 08/754,721, filed Nov. 21, 1996 which issued as U.S. Pat. No. 5,978,477;

(2) U.S. patent application Ser. No. 10/235,035 filed concurrently with this application;

(3) U.S. patent application Ser. No. 10/235,042 filed concurrently with this application;

(4) U.S. patent application Ser. No. 10/235,032 filed concurrently with this application;

(5) U.S. patent application Ser. No. 10/235,030 filed concurrently with this application; and (6) U.S. patent application Ser. No. 10/234,414 filed concurrently with this application, which issued as U.S. Pat. No. 6,860,422.

BACKGROUND OF THE INVENTION

The present invention relates generally to the field of document processing, and more particularly to techniques for performing actions based upon physical locations of one or more paper documents.

The number of paper documents used in commercial and non-commercial environments has increased substantially with the proliferation of copiers, printers, facsimile machines, and other paper document producing devices. As a result, the ability to track physical locations of paper documents is of great importance, especially in an office environment. In addition to tracking the locations of paper documents, users also frequently need to perform one or more actions based on the physical locations of the paper documents. Conventionally available systems do not provide the ability to perform actions based on physical locations of paper documents.

In light of the above, there is a need for techniques that facilitate actions to be performed based upon physical locations of one or more paper documents.

BRIEF SUMMARY OF THE INVENTION

Embodiments of the present invention provide techniques for performing one or more actions based upon physical locations of one or more paper documents. According to an embodiment of the present invention, the paper documents have identification tags physically associated with them. The physical locations of the paper documents are determined based upon information read from the identification tags physically associated with the paper documents. One or more actions are performed based upon the physical locations of the paper documents.

According to an embodiment of the present invention, techniques are provided for performing an action based upon physical locations of paper documents. This embodiment of the present invention receives information identifying a first physical location and a first action to be performed. The embodiment also receives information read from identification tags physically associated with one or more paper documents located at the first physical location. For each paper document in the one or more paper documents, paper document-related information for the paper document is determined based upon information read from the identification tag physically associated with the paper document. The first action is then performed using the paper document-related information corresponding to at least one paper document in the one or more paper documents.

According to another embodiment of the present invention, techniques are provided for performing an action. In this embodiment, a data processing system receives information specifying a physical location, a condition associated with the physical location, and an action to be performed if the condition associated with the physical location is satisfied. The data processing system also receives information read from identification tags physically associated with one or more paper documents located at the physical location. The data processing system then determines if the condition associated with the physical location is satisfied based upon the information read from the identification tags physically associated with the one or more paper documents located at the physical location. The action is performed if the condition associated with the physical location is satisfied.

The foregoing, together with other features, embodiments, and advantages of the present invention, will become more apparent when referring to the following specification, claims, and accompanying drawings.

DETAILED DESCRIPTION OF THE INVENTION

Figure 1:
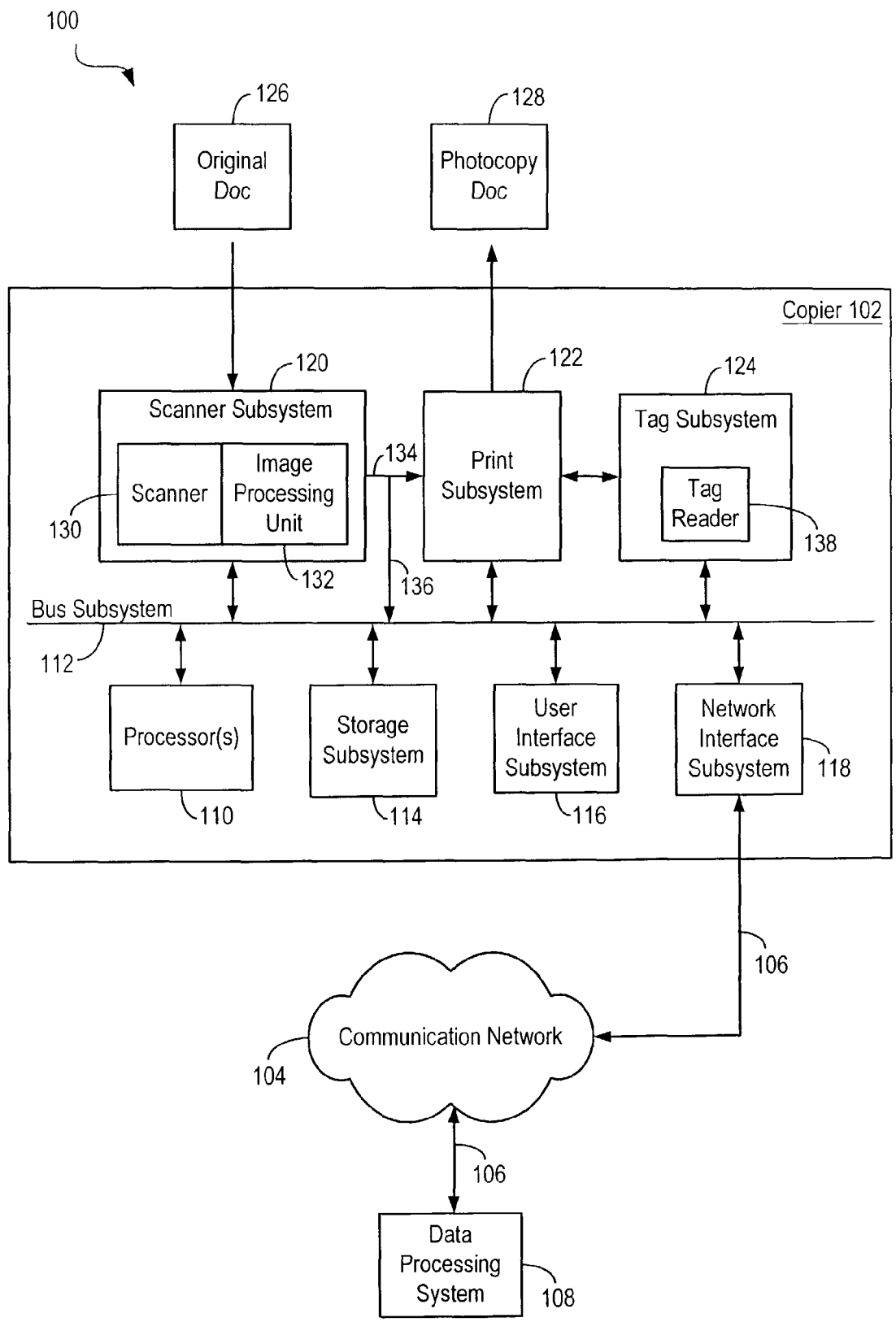
FIG. 1 is a simplified block diagram of a network environment comprising a copier that is configured to physically associate identification tags with paper documents according to an embodiment of the present invention.

Embodiments of the present invention provide techniques for performing one or more actions based upon physical locations of one or more paper documents. For purposes of this invention, the term "paper document" is intended to refer to a document comprising one or more pages of any tangible medium on which information can be printed, written, drawn, imprinted, embossed, etc. For example, a paper document may refer to a document printed by a printer, a document output by a copier or scanner, a document output by a facsimile machine, a photograph, a book, a single page of paper, a document comprising a plurality of papers, and the like. In alternative embodiments, the teachings of the present invention may also be applied to other types of objects.

For purposes of this invention, the term "electronic document" is intended to refer to information stored in an electronic or digital form. Examples of electronic documents include files, documents created using application programs such as word processors, email programs, image editors, etc., scanned images of paper documents, documents stored in various formats such as PDF, Postscript, etc., and other types of documents stored in electronic form.

According to the teachings of the present invention, actions are performed based upon physical locations of paper documents that have identification tags physically associated with them. Each identification tag that is physically associated with a paper document is configured to store information that facilitates identification of the physical location of the paper document. The information stored in the identification tag is also used to perform actions based upon the physical location of the paper document.

According to an embodiment of the present invention, each identification tag stores information that can be used to uniquely identify the paper document with which the identification tag is physically associated. For example, an identification tag may store an identification code that may be used to uniquely identify a paper document with which the identification tag is physically associated. It should be understood that other types of information that can be used to identify documents might also be stored in an identification tag in alternative embodiments of the present invention.

Depending upon the type of identification tag used, the identification code information may be stored in the memory of the identification tag when the tag is manufactured, when the tag is activated, or at some later time using software or hardware techniques. For example, a paper document output device may be configured to store a unique identification code in the memory of an identification tag that physically associated with a paper document or is selected to be physically associated with a paper document generated by the paper document processing device.

In addition to identification code information, other types of information related to a paper document may also be stored in an identification tag that is physically associated with the paper document. For example, the information stored in an identification tag may include an electronic representation of the contents of the paper document (e.g., a scanned image of the paper document, a Postscript format file or Portable Document Format (PDF) or image format or other file format, etc.), information identifying the author of the paper document, the date when the paper document was created, the number of pages in the paper document, and other like information. Other information that can be stored in an identification tag is described in U.S. application Ser. No. 10/235,035, U.S. application Ser. No. 10/235,042, U.S. application Ser. No. 10/235,032, U.S. application Ser. No. 10/235,030, and U.S. application Ser. No. 10/234,414, the entire disclosures of which are herein incorporated by reference for all purposes.

Various devices known to those skilled in the art may be used as identification tags. A device that can be used as an identification tag generally includes an on-device memory that is capable of storing information that can be read by a tag reader. As previously indicated, depending on the type of identification tag used, the information (e.g., identification code information) stored in the identification tag may be stored in the memory of the identification tag when the tag is manufactured, when the tag is activated, or at some later time using software or hardware programming applications.

Various different types of tag readers may be used to read information stored by identification tags. The type of tag reader used and the technique used by the tag reader for reading the information stored on an identification tag depends on the type of the identification tag. According to an embodiment of the present invention, a tag reader may read information from an identification tag by scanning the identification tag. In other embodiments, a tag reader may read the information by receiving the information from the identification tag. A tag reader may receive the information from an identification tag in response to an external stimulus (e.g., electromagnetic energy) or signal provided to the identification tag. The external stimulus or signal may be provided by the tag reader or by some other device or application. If the identification tag is self-powered, the identification tag may be configured to communicate the information stored by the identification tag to the tag reader. A tag reader may read the information stored by a tag reader in various forms including electromagnetic waves, electronic signals, acoustic signals, etc.

According to an embodiment of the present invention, radio frequency identification devices (RFIDs) may be used as identification tags. For example, the Mu-chip manufactured by Hitachi, Ltd. may be used as an identification tag. The Mu-chip is a radio recognition IC chip that measures 0.4-mm quare and is 60 microns thick in its present embodiment. Due to its reduced size, the Mu-chip can be embedded in paper. The Mu-chip comprises an on-chip memory (presently a 128-bit ROM) that can be programmed to store information such as the identification code for a paper document.

In its present embodiment, information stored by a Hitachi Mu-chip can be read by exposing the Mu-chip to 2.45 GHz band microwaves. The Mu-chip uses the microwave energy as a power source and communicates the information stored in the on-chip memory in the form of radio waves that can be detected and read by a tag reader. In alternative embodiments, the Mu-chip may also include an on-chip antenna to increase the communication distance range. In yet other embodiments, a power source may be provided on the Mu-chip and the Mu-chip may be programmed to communicate the information stored by the Mu-chip to a tag reader.

As indicated above, according to the teachings of the present invention, an identification tag is physically associated with a paper document. Various different techniques may be used to physically associate an identification tag with a paper document. The identification tag may be permanently or temporarily attached to a paper document or a page of the paper document. The tag may be attached to the paper document using clips, staples, adhesives, ties, strings, rubber bands, labels with identification tags, and the like. The identification tag may be embedded in a page of the paper document. An identification tag may also be incorporated into an object such as a label, a staple, etc. that is attached to the paper document.

According to an embodiment of the present invention, an identification tag may be physically associated with a paper document at the time the paper document is generated or produced. In this embodiment, the tag may be physically associated with the paper document by the device (referred to as a "paper document output device") that produces or generates the paper document. Examples of paper document output devices include printers, scanners, copiers, facsimile machines, and the like. For example, a copier may be configured to physically associate an identification tag to a photocopy generated by the copier. Likewise, a printer may physically associate an identification tag with a paper document printout generated by the printer. A facsimile machine may physically associate an identification tag with a paper document facsimile output. Likewise, other paper document output devices may be configured to physically associate identification tags with paper documents generated by the devices.

As described above, various different techniques may be used to physically associate an identification tag with a paper document. According to one technique, depending on the size of the identification tag, the identification tag is embedded in a page of the paper document. For example, the Mu-chip due to its reduced size can be embedded in a paper page. A paper page that has an identification tag embedded in it may be referred to as "tagged paper". Accordingly, in an embodiment using Hitachi Mu-chips as identification tags, a paper document output device may physically associate an identification tag with a paper document by using at least one tagged paper to generate the paper document. Accordingly, if a paper document output device has access to tagged paper, the paper document output device may use one or more of the tagged papers to generate the paper document.

An identification tag may also be physically associated with a paper document by physically applying or attaching the identification tag to the paper document. An identification tag may also be physically associated with a paper document generated by a paper document output device using an adhesive, a clip, a staple, a rubber band, a tie, or other like mechanism. The identification tag may also be incorporated into an object (e.g., a staple, a clip, etc.) that is attached to the paper document.

According to an embodiment of the present invention, an identification tag may be physically associates with a paper document by mixing the identification tag in the ink that is printed on one or more pages of the paper document.

In alternative embodiments, a paper document output device may dispense a sticker or label comprising an identification tag. The identification tag may be physically associated with a paper document generated by a paper document output device by applying the sticker or label to the paper document. For example, a copier may dispense a label comprising an identification tag and a user may be requested to apply the dispensed label to a photocopy generated by the copier. Various other techniques may also be used to physically associate an identification tag with a paper document.

According to an embodiment of the present invention, if the size of the identification tag permits, the identification tag may be physically associated with a paper document such that it is not directly visible to the unaided observer or user of the paper document. For example, the identification tag may be embedded in a page of the paper document, the identification tag may be embedded or mounted on a staple that is attached to the paper document.

According to the teachings of the present invention, in addition to physically associating an identification tag with a paper document, a paper document output device is also configured to read information, including identification code information, from an identification tag that is physically associated with a paper document generated by the paper document output device. For example, a copier is configured to read identification code information stored in the memory of an identification tag that is physically associated with a photocopy generated by the copier.

The information read from an identification tag may then be stored. According to an embodiment of the present invention, the identification code read from an identification tag that is physically associated with a paper document is stored along with other information related to the paper document (referred to as "paper document-related information"). The information for a paper document is stored such that the paper document-related information for the paper document is associated with the identification code read from an identification tag that is physically associated with paper document. The information is stored such that the paper document-related information can be retrieved given the identification code for the paper document.

The paper document-related information that is associated with a particular identification code identifying a particular paper document may include various types of information related to the particular paper document. The paper document-related information may include information read from identification tags and other information. For a particular identification code, paper document-related information associated with the identification code may include an electronic representation of the paper document (e.g., scanned images of the paper document, electronic document corresponding to the paper document, etc.) identified by the identification code, information identifying the paper document (e.g., title of the paper document, etc.), information identifying an electronic representation of the paper document (e.g., a filename, directory location, etc.), electronic document information (described in U.S. application Ser. No. 10/235, 042, information identifying the physical location of the paper document (described in U.S. application Ser. No. 10/235,035, and other information. The paper document-related information may also include information identifying another document related to the paper document.

According to an embodiment of the present invention, the identification code information and the paper document-related information is stored in a database (referred to as the "paper document tracking database"). The information in the paper document tracking database may be indexed by the identification code information. In one embodiment, paper document tracking database may be implemented as a table wherein each row of the table stores information related to a particular identification code. Each row (or record) of paper document tracking database may store paper document-related information corresponding to the identification code. The paper document tracking database thus stores information identifying one or more identification codes and corresponding paper document-related information for each identification code. Information stored in the paper document tracking database is used to perform actions based upon physical locations of paper documents.

It should be understood that various other techniques may be used for storing identification code information and the corresponding paper document-related information. For example, the information may be stored in a file, in one or more data structures, and the like. The information may be stored in a memory location accessible to the paper document output device. The memory used for storing the information may be part of the paper document output device or may be part of another system or device coupled to the paper document output device.

As described above, a paper document output device such as a copier may be configured to physically associate an identification tag with a paper document and read and store information that is used to perform actions based upon physical locations of paper documents. FIG. 1 is a simplified block diagram of a network environment 100 comprising a copier 102 that is configured to physically associate identification tags with paper documents according to an embodiment of the present invention. As depicted in FIG. 1, copier 102 is coupled to network 104 via communication links 106. A data processing system 108 may be also be coupled to network 104 via communication links 106. Network environment 100 depicted in FIG. 1 is merely illustrative of an environment incorporating the present invention and does not limit the scope of the invention as recited in the claims. One of ordinary skill in the art would recognize other variations, modifications, and alternatives.

Communication network 104 depicted in FIG. 1 provides a mechanism for allowing communication and exchange of data and information between data processing system 108 and copier 102 and other data processing systems or devices. Communication network 104 may itself be comprised of many interconnected computer systems and communication links. Communication network 104 may be embodied as a direct connection, a LAN, a wide area network (WAN), a wireless network, an Intranet, the Internet, a private network, a public network, a switched network, or any other suitable communication network.

The communication links used to connect the various systems depicted in FIG. 1 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

As shown in FIG. 1, copier 102 includes a processor 110 that communicates with a number of peripheral subsystems via a bus subsystem 112. These peripheral subsystems may include a storage subsystem 114, a user interface subsystem 116, a network interface subsystem 118, a scanner subsystem 120, a print subsystem 122, and a tag subsystem 124.

Bus subsystem 112 provides a mechanism for letting the various components and subsystems of copier 102 communicate with each other as intended. Although bus subsystem 112 is shown schematically as a single bus, alternative embodiments of the bus subsystem may utilize multiple buses.

User interface subsystem 116 allows user interaction with copier 102. A user may be a human user, a device, a process, another computer, and the like. User interface subsystem 116 may be implemented using a touch pad, a touch screen, mechanical buttons, application programming interfaces (APIs), and the like. Interface 116 allows the user to select options for generating a photocopy 128 from an original document 126. For example, interface 116 may allow the user to select the paper size to be used for generating the photocopy, the copy darkness, the copy contrast, number of copies to be produced, magnification/reduction ratio, and other like options known to those skilled in the art. A "Copy/Start" key that allows the user to initiate the copying function may also be provided by interface 116. Copier 102 accepts a document 126 (also referred to as the "original document") and prints a copy 128 (or photocopy) upon selection of the "Start/Copy" key.

According to an embodiment of the present invention, interface 116 may also allow the user to select if an identification tag is to be physically associated with photocopy paper document 128. For example, before photocopying a original document 126, interface 116 may prompt the user to select whether an identification tag is to be physically associated with the photocopy. An identification tag is then physically associated with the photocopy paper document if selected by the user.

In an alternative embodiment of the present invention, an identification tag may be physically associated with the photocopy without prompting the user. In this embodiment of the present invention, activation of the "Copy/Start" key by the user is sufficient to initiate the photocopying function, cause physical association of an identification tag with the photocopy paper document, and cause reading and archival of the identification code (and potentially other information stored by the identification tag) read from the identification tag that is physically associated with the paper document. Depressing the "Copy/Start" key represents a single user command that is interpreted by copier 102 to request both copying, physically associating the identification tag, and reading and archival of information stored by the identification tag. In this embodiment, the user may not be aware that an identification tag has been physically associated with the photocopy produced by copier 102 and that the identification code read from the identification tag and information related to the photocopy has been automatically archived by copier 102.

User interface subsystem 116 also serves as an interface for outputting information to the user. For example, information related to the status of copier 102 or information related to the functions performed by copier 102 may be output to the user via interface 114.

Network interface subsystem 118 provides an interface to other computer systems (e.g., data processing system 108), networks, and devices. Embodiments of network interface subsystem 118 include an Ethernet card, a modem (telephone, satellite, cable, ISDN, etc.), (asynchronous) digital subscriber line (DSL) units, and the like. Network interface system 118 facilitates transfer of information to and from copier 102 in an appropriate format.

Processor 110 performs or controls the functions performed by the various subsystems of copier 102. These functions include physically associating identification tags with photocopies, reading information from identification tags, and archiving the read information. According to an embodiment of the present invention, processor 110 executes a control program that controls operation of copier 102.

Storage subsystem 114 may be configured to store the basic programming and data constructs that provide the functionality of copier 102. For example, according to an embodiment of the present invention, software modules and control programs implementing the functionality of copier 102 may be stored in storage subsystem 114. Processor 110 may execute these software modules. Storage subsystem 114 may also provide a repository or database for storing information according to the teachings of the present invention. For example, the identification code information and corresponding paper document-related information may be stored in storage subsystem 114. It should be understood that the actual archival of identification codes information and photocopy documents-related information may occur either locally (i.e., in storage subsystem 114) or remotely on some other system. For example, according to an embodiment of the present invention, copier 102 may communicate the information to data processing system 108 that may then store the information.

Scanner subsystem 120 includes a scanner 130 and an image-processing unit 132. Scanner 130 is configured to capture an image of original document 126 and transmit the image to image processing unit 132. Image processing unit 132 operates to remove distortion inherent in the scanning process. The output of the image-processing unit is a scanned image of original document 126 with the distortion removed. The scanned image is then forwarded to print subsystem 122 for further processing via video bus 134.

According to an embodiment of the present invention, an image data tap 136 provides processor 110 with access to scanned image data transferred over video bus 134. In alternative embodiments of the present invention, the image scanned by scanner 130 may be provided to processor 110 by scanner subsystem 120.

Print subsystem 122 operates in accordance with well-known laser xerography principles and is configured to receive scanned information from scanner subsystem 120 and produce a paper document photocopy 128 of original document 126. Print engine 122 operates in synchrony with tag subsystem 124 to ensure that an identification tag is appropriately physically associated with photocopy 128 and information from the identification tag is read and stored.

Tag subsystem 124 is configured to physically associate identification tags with photocopies generated by copier 102. As described above, various different techniques may be used to physically associate an identification tag with a photocopy paper document. For example, at least one tagged paper (e.g., paper with an identification tag, such as the Hitachi Mu-chip, embedded in it) may be used to generate photocopy 128. According to an embodiment of the present invention, tag subsystem 124 ensures that at least one tagged page is used to generate photocopy 128. If the photocopy consists of multiple pages, then normal paper pages (i.e., paper pages without the embedded identification tag) may be used for other pages of the photocopy paper document.

An identification tag may also be physically applied or attached to paper document 128. If the size of the identification tag permits, the identification tag may be attached to the paper document photocopy 128 such that it is not directly visible to the unaided observer or user of paper document 128. For example, tag subsystem 124 may attach a staple with an identification tag embedded in it (or mounted on it) to photocopy document 128. The identification tag may also be attached to the photocopy paper document by mixing it in the ink that is printed on the photocopy when the photocopy is generated by print subsystem 122. The identification tag may also be applied to the photocopy paper document using an adhesive (e.g., a sticker comprising the identification tag may be applied to a page of the photocopy). Various other techniques may also be used to physically associate an identification tag with the paper document.

As previously described, each identification tag may store a unique identification code that is used to identify the paper document with which the identification tag is physically associated. The identification code may be programmed into the identification tag when the identification tag is manufactured or activated. According to an embodiment of the present invention, tag subsystem 124 is configured to store a unique identification code in the memory of an identification tag that is selected to be physically associated with photocopy 128 or has already been physically associated with photocopy 128. Hardware or software modules configured to program the identification tag may be incorporated in tag subsystem 124.

If the identification code is already stored in identification tags used by copier 102, tag subsystem 124 is configured to read the identification code from an identification tag that has been physically associated with photocopy paper document 128 generated by copier 102 or that is selected to be physically associated with photocopy document 128. One or more tag readers 138 may be incorporated in tag subsystem 124 to facilitate reading of the identification code information and other information from identification tags.

The type of tag readers used and the techniques used for reading information from identification tags depends on the type of identification tags. For example, if a Hitachi Mu-chip is used as an identification tag, tag readers 138 included in tag subsystem 124 may be constructed to expose each identification tag to 2.45 GHz band of microwaves and to detect and read radio waves emanating from the identification tag. Various other types of tag readers that are capable of detecting electromagnetic, optical, acoustical, or other signals may be used in alternative embodiments of the present invention using other forms of identification tags.

It should be understood that in addition to identification code information other information stored in identification tags used by copier 102 may also be read by tag readers 138. The information read from the identification tags is then stored in a paper document tracking database. The information may be locally stored by copier 102 (e.g., in storage subsystem 114). Alternatively, the information may be forwarded to data processing system 108 for storage, or may be stored on some other computer system or storage device accessible to copier 102.

According to an embodiment of the present invention, the scanned image output of scanner subsystem 120 is stored along with the identification code information. The scanned image of an original paper document is stored as part of the paper document-related information that is associated with an identification code read from an identification tag that is physically associated with a photocopy generated from the original paper document.

The various subsystems of copier 102 function in synchrony to ensure proper functioning of copier 102 according to the teachings of the present invention. Various synchronization signals known to those skilled in the art may be used to achieve this synchronization. Many other configurations of copier 102 are possible having more or fewer components than the system depicted in FIG. 1.

Figure 2:
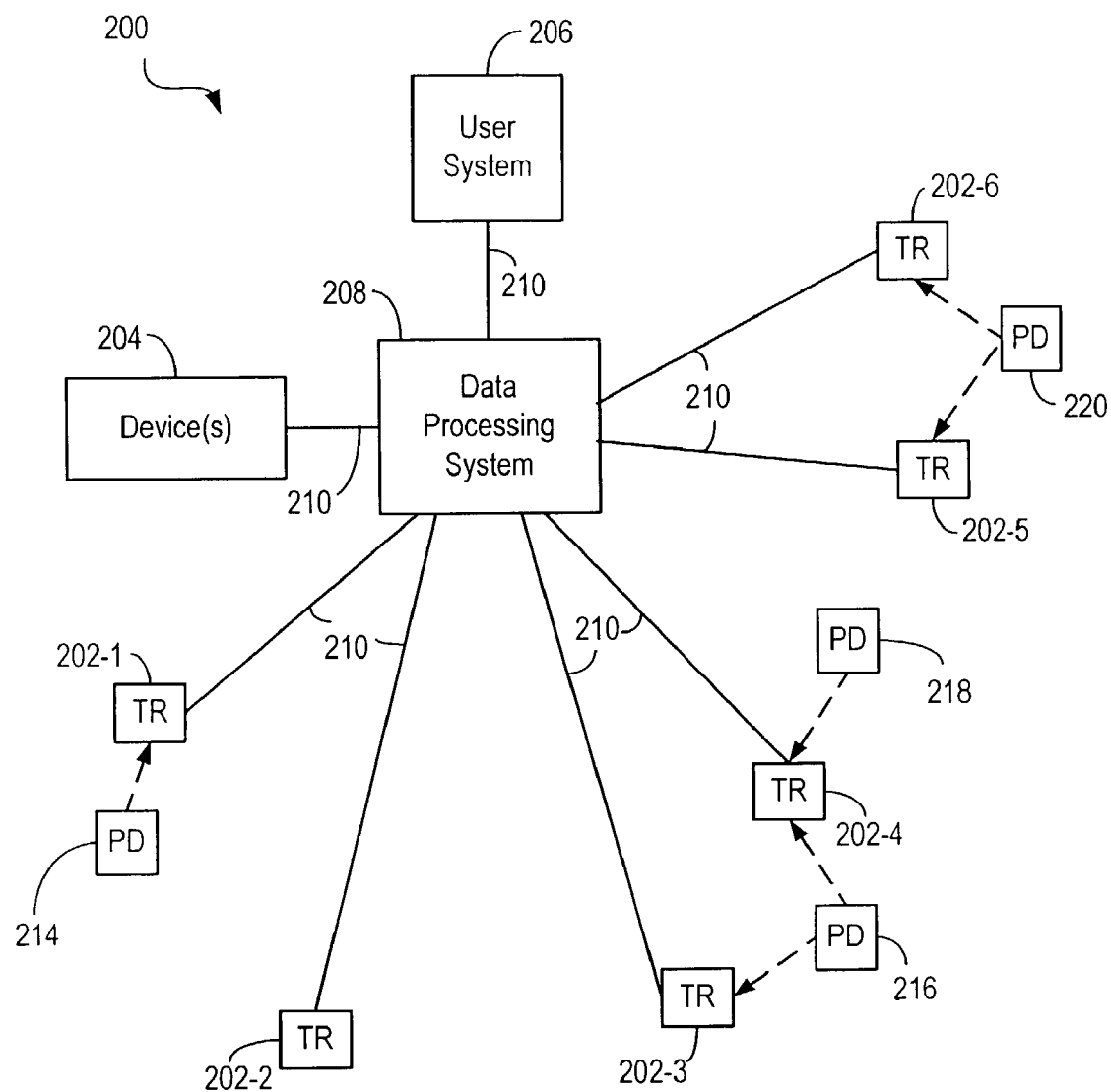
FIG. 2 is a simplified block diagram of a distributed system that may be used to perform actions based upon physical locations of paper documents according to an embodiment of the present invention.

As indicated above, according to the teachings of the present invention, the information stored in the paper document tracking database is used to determine physical locations of paper documents that have an identification tag physically associated with them and to perform actions based upon the physical locations. FIG. 2 is a simplified block diagram of a distributed system 200 that may be used to perform actions based upon physical locations of paper documents according to an embodiment of the present invention. The configuration depicted in FIG. 2 is merely illustrative of an environment incorporating the present invention and does not limit the scope of the invention as recited in the claims. One of ordinary skill in the art would recognize other variations, modifications, and alternatives.

As depicted in FIG. 2, system 200 comprises a plurality of tag readers (TRs) 202, devices 204, and a user system 206 coupled to a data processing system 208 via communication links 210. Communication links 210 depicted in FIG. 2 may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Tag readers 202 are configured to read information, including identification code information, stored by identification tags that are physically associated with one or more paper documents and to facilitate determination of physical locations of the one or more paper documents. Whether or not a tag reader 202 can read identification code from an identification tag that is physically associated with a paper document depends on the proximity of the paper document to the tag reader. If an identification tag has an on-board power supply (e.g., an on-board battery) and is capable of communicating information (including identification code information) stored in the memory of the identification tag, a tag reader 202 can detect and read the identification code from the identification tag if the reception range of the tag reader overlaps with the communication range of the identification tag.

If an identification tag does not have its own power supply and depends on power supplied by an external entity such as a tag reader, then a tag reader is able to read information, including identification code information, from the identification tag if the tag reader can expose the identification tag to the requisite energy and can read the information transmitted (or radiated) by the identification tag in response to the energy. For example, if a Hitachi Mu-chip is used as an identification tag, a tag reader can read information stored by the Mu-chip if the tag reader is able to expose the Mu-chip to 2.45 GHz band microwaves and is able to read the radio waves that emanate from the irradiated Mu-chip identification tag.

The manner in which a tag reader reads the identification code from an identification tag depends on the type of tag reader and the type of identification tag used. Likewise, a tag reader's ability to detect and read identification code from an identification tag depends on the type of tag reader and the type of identification tag and the proximity of the identification tag to the tag reader.

A tag reader is thus able to read information stored by an identification tag that is physically associated with a paper document if the paper document is physically located proximal or near to the tag reader (i.e., the identification tag that is physically associated with the paper document is at a distance from the tag reader where the tag reader can read information stored by the identification tag). It should be understood that multiple tag readers may be able to read information stored by a particular identification tag that is physically associated with a paper document that is located proximal to the tag readers (i.e., at a distance from where the tag readers can read information from the identification tag physically associated with the paper document).

For example, in the embodiment depicted in FIG. 2, tag reader 202-1 is able to read the identification code from an identification tag physically associated with paper document (PD) 214. Tag readers 202-3 and 202-4 can read the identification code from the identification tag physically associated with paper document 216. Tag reader 202-4 is also able to read the identification code from an identification tag physically associated with paper document 218. Tag readers 202-5 and 202-6 can read the identification code from the identification tag physically associated with paper document 220.

Since a tag reader is thus able to read information stored by an identification tag that is physically associated with a paper document if the paper document is physically located proximal or near to the tag reader, the physical location of a particular paper document can be approximated to be the same as the physical location of a tag reader. Accordingly, the physical location of the paper document can be determined based on the physical location of the tag reader. If multiple tag readers are able to read information from an identification tag associated with a particular paper document, it indicates that the particular paper document is physically located in a location or zone proximal to the multiple tag readers. As described below, data processing system 208 is configured to receive information read by the individual tag readers from the identification tags and to determine the physical locations of the paper documents corresponding to the identification tags.

According to an embodiment of the present invention, tag readers 202 may be configured to send out signals at periodic time intervals to interrogate and read information including identification code information from identification tags that the tag readers can detect and read. In alternative embodiments, a tag reader 202 may be configured to interrogate identification tags that are proximal to the tag reader in response to a signal received from an external system, device, or application, or in response to external stimuli. For example, a tag reader may be configured to interrogate identification tags that are proximal to the tag reader upon receiving a signal from data processing system 208.

In addition to the identification code information, a tag reader may also be configured to read other information stored in an identification tag interrogated by the tag reader. According to an embodiment of the present invention, tag reader 202 may timestamp the read information to indicate when (e.g., date and time) the information was read. The read information may then be stored. The information may be stored by the tag reader or may be forwarded by the tag reader to a central database or computer system (e.g., data processing system 208) that may store and/or process the information.

Data processing system 208 is configured to process requests received from user system 206 to perform one or more actions based upon physical locations of paper documents in distributed system 200. Data processing system 102 uses information received from tag readers 202 to process the requests.

According to an embodiment of the present invention, upon receiving a request to perform an action, data processing system 208 causes tag readers 202 to interrogate identification tags physically associated with paper documents that are located proximal to the tag readers and can be detected and read by the tag readers. The tag readers are configured to interrogate identification tags and communicate information read from the identification tags (which includes identification code information) to data processing system 208. Data processing system 208 then analyzes the information and determines physical locations of paper documents identified by the identification codes received from the tag readers.

As described above, if a particular tag reader is able to read the identification code from an identification tag physically associated with a particular paper document, it implies that indicates that the particular paper document is physically located proximal to the particular tag reader. The physical location of the paper document can be then determined based on the physical location of the tag reader. Accordingly, in order to determine physical locations of the paper documents, for each tag reader from whom identification code information is received, data processing system 208 first determines the physical location of the tag reader.

According to an embodiment of the present invention, data processing system 208 stores (or has access to) information (referred to as "tag reader location information") identifying physical locations of one or more tag readers in distributed system 200. For example, the tag reader location information may indicate that tag reader 202-1 is located in John's office, tag reader 202-2 is located in John's briefcase, tag readers 202-3 and 202-4 are located in the conference room, tag reader 202-5 is located on Mr. Smith's office desk, tag reader 202-6 is located in Mr. Smith's in-box container in his office, and so on.

Data processing system 208 uses the tag reader location information to determine physical locations of tag readers that are able to read one or more identification codes from identification tags. The physical location of a paper document identified by an identification code read by tag reader is then determined based upon the physical location of a tag reader. For example, if tag reader 202-1 is able to read information from an identification tag that is physically associated with paper document 214, then the physical location of paper document 214 is determined to be the same as the physical location of tag reader 202-1.

One or more actions requested by the action request received from user system 206 may then be performed based upon the physical locations of the paper documents. According to an embodiment of the present invention, the actions may be performed using the paper document-related information stored in the paper document tracking database. As described earlier, the paper document tracking database stores information identifying identification codes and paper document-related information corresponding to the identification codes. Data processing system 208 may determine paper document-related information corresponding to each identification code read by the tag readers and perform an action using the paper document-related information.

The action specified in a request may be performed by data processing system 208, by some device 204 upon receiving a signal from data processing system 208 to perform the action, or by data processing system 208 in combination with some other device. As described below, various different kinds of actions may be performed. Examples of actions include emailing, faxing, copying, printing, and other types of actions.

A user may configure a request to perform an action using user system 206. A user interface may be displayed on user system 206 that allows the user to configure the request. User system 206 may be a personal computer, a portable computer, a workstation, a computer terminal, a network computer, a kiosk, a personal digital assistant (PDA), a communication device such as a cell phone, or any other data processing system. It should be understood that in alternative embodiments of the present invention, a user might also use input devices coupled to data processing system 208 to configure a request.

The information contained in a request may specify the one or more actions to be performed and the criteria involving physical locations of paper documents for performing the actions. Various different types of requests may be received.

According to an embodiment of the present invention, a request received by data processing system 208 specifies that one or more actions be performed using paper document-related information corresponding to one or more paper documents that are physically located at a specified particular physical location. A physical location may correspond to a zone or area in which a paper document may be located.

Figure 3:
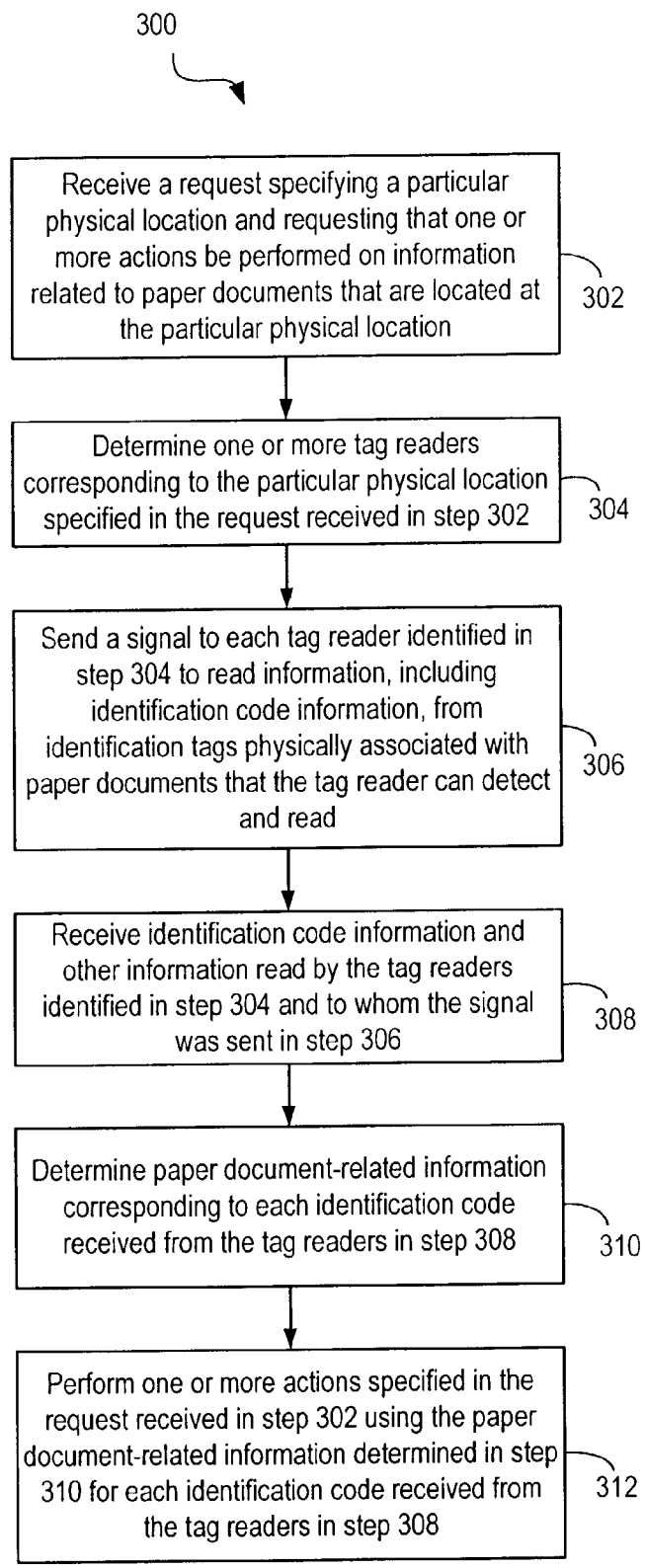
FIG. 3 is a simplified high-level flowchart depicting a method of processing a request that specifies a particular physical location and one or more actions to be performed using paper document-related information related to paper documents that are physically located at the particular physical location according to an embodiment of the present invention.

FIG. 3 is a simplified high-level flowchart 300 depicting a method of processing a request that specifies a particular physical location and one or more actions to be performed using paper document-related information related to paper documents that are physically located at the particular physical location according to an embodiment of the present invention. The method may be performed by data processing system 208, or by data processing system 208 in association with devices 204 or other data processing systems. For example, the method may be performed by software modules executed by processor(s) of data processing system 208, or by hardware modules coupled to data processing system 208, or combinations thereof. Flowchart 300 depicted in FIG. 3 is merely illustrative of an embodiment incorporating the present invention and does not limit the scope of the invention as recited in the claims. One of ordinary skill in the art would recognize variations, modifications, and alternatives.

As depicted in FIG. 3, processing is initiated when data processing system 208 receives a request comprising information specifying a particular physical location and requesting that one or more actions be performed on information related to paper documents that are located at the particular physical location (step 302). The request may be received from various sources. According to an embodiment of the present invention, the request is received from user system 206. The request may also be configured by a user interacting with data processing system 208. It should be understood that one or more physical locations might be specified in the request.

There are various ways in which a user may specify the physical location. According to an embodiment of the present invention, the physical location may correspond to a zone or area, e.g., John's office, a particular conference room, Mr. Smith's office desk, Mr. Smith's in-box container in his office, Mr. Smith's briefcase, and so on. Other types of coordinates may also be used for specifying a physical location. According to an embodiment of the present invention, a user may specify a physical location by identifying one or more tag readers located at the physical location. In this embodiment, a user interface may be displayed to the user displaying the various tag readers deployed in the system and physical locations of the tag readers. A user via the user interface can then specify a physical location by selecting one or more tag readers located at the physical location.

In addition to specifying a physical location, a request received in step 302 also specifies one or more actions to be performed. If multiple physical locations are specified in the request, then one or more actions may be specified for each physical location. Examples of requests include: (a) fax contents of all paper documents located in Mr. Smith's in-box to John; (b) make copies of paper documents in the conference room; (c) print one copy of every document in John's office; (d) compose and send an email to John Doe comprising electronic versions of paper documents located in Mary's briefcase and on Mary's desk; (e) and the like.

Data processing system 208 then determines one or more tag readers corresponding to the physical location specified in the request received in step 302 (step 304). According to an embodiment of the present invention, data processing system 208 uses the tag reader location information to determine one or more tag readers corresponding to the user-specified physical location. For example, if the user has specified Mr. Smith's office desk, then tag reader 202-5 (from the previous example) is identified in step 304. If multiple physical locations are specified in the request, then in step 302, tag readers for each of the specified physical locations are determined. It should be understood that step 304 may not be needed if the user has specified the physical location by selecting one or more tag readers.

Data processing system 208 then sends a signal to each tag reader identified in step 304 to read identification code information and other information from identification tags physically associated with one or more paper documents that the tag reader can detect and read (step 306). As described above, if a particular tag reader identified in step 304 is able to read an identification code from an identification tag physically associated with a particular paper document, it indicates that the particular paper document is physically located proximal to the tag reader.

In alternative embodiments of the present invention, the tag readers may be configured to forward information read from the identification tags to data processing system 208 at periodic time intervals. In these embodiments, step 306 may not be needed.

Data processing system 208 then receives identification code information and other information read by the tag readers identified in step 304 (step 308).

Data processing system 208 then determines paper document-related information corresponding to each identification code received from the tag readers in step 308 (step 310). According to an embodiment of the present invention, information stored in the paper document tracking database is used to determine paper document-related information for the identification codes received from the tag readers. The paper document tracking database is searched to identify records whose identification codes match the identification codes read by the tag readers. Paper document-related information for the identification codes is then determined from the matching records.

In alternative embodiments, the paper document-related information for a paper document may be stored in an identification tag that is physically associated with a paper document and may be read by the tag readers along with the identification code information. For such a paper document, data processing system 208 may receive the paper document-related information along with the identification code information for the document in step 308. In this scenario, data processing system 102 need not query the paper document tracking database to determine paper document-related information for the paper document since the paper document-related information is read directly from an identification tag that is physically associated with the paper document.

As previously described, the paper document-related information corresponding to an identification code may comprise (or store a pointer to) a representation of the contents of the particular paper document (e.g., scanned images of the paper document, electronic document corresponding to the paper document), information identifying the paper document (e.g., title of the paper document, etc.), information identifying an electronic representation of the paper document (e.g., a filename, directory location, etc.), and the like. The paper document-related information may also include information identifying another document related to the paper document.

One or more actions specified in the request received in step 302 are then performed using the paper document-related information determined for the one or more identification codes received from the tag readers in step 308 (step 312). According to an embodiment of the present invention, an action is performed using paper document-related information determined for at least one paper document located in the physical location specified in the request.

As indicated above, the paper document-related information corresponding to an identification code may be determined from the paper document tracking database. The paper document-related information may also be read from the identification tags along with the identification code and received from the tag readers. The actions may be performed by data processing system 208, by devices 204 coupled to data processing system 208, or by data processing system 208 in collaboration with one or more devices 204, or by other systems or devices.

Various different kinds of actions may be performed including emailing, faxing, copying, printing, or any other action using the paper document-related information or a portion thereof. For example, if the paper document-related information corresponding to an identification code includes an electronic representation of a paper document, the electronic representation may be emailed to an addressee specified in the request received in step 302. Likewise, if the paper document-related information corresponding to an identification code includes a scanned image of the paper document, the scanned image may be printed on a printer specified in the request. Various other types of actions may also be performed using the paper document-related information corresponding to identification codes read by the tag readers.

According to an embodiment of the present invention, the present invention stores information identifying actions that have been performed for a paper document identified by a particular identification code. The actions-related information may be stored in paper document tracking database and associated with the particular identification code. For example, if the paper document-related information corresponding to the particular identification code was faxed, the following action-related information may be stored in the paper document tracking database and associated with the particular identification code:

FAXED to 650-854-8740 ON Aug. 23, 2000 AT 16:46:21

As shown above, the action-related information identifies an action that was performed, the date when the action was performed, and the time when the action was performed. It should be understood that the action-related information may comprise other types of information in alternative embodiments of the present invention.

By storing action-related information for each action performed for an identification code, information identifying a history of actions performed for the paper document identified by the identification code may be stored.

According to an embodiment of the present invention, the actions-related information may also be stored in an identification tag that is physically associated with a paper document. In this embodiment, the identification tag can be scanned to determine actions that have been performed on paper document-related information corresponding to the paper document to which the identification tag is attached. In this embodiment, the paper document represents an autonomous document that "stores" information identifying actions that have been performed on the document.

As described above, FIG. 3 depicts a method for processing a request received by data processing system 208 that identifies one or more physical locations and actions to be performed using paper document-related information corresponding to paper documents physically located at the specified one or more locations. Various other types of requests may be received by data processing system 208. According to an embodiment of the present invention, data processing system 208 receives a request that specifies selection criteria and one or more actions to be performed if the selection criteria is satisfied.

Figure 4:
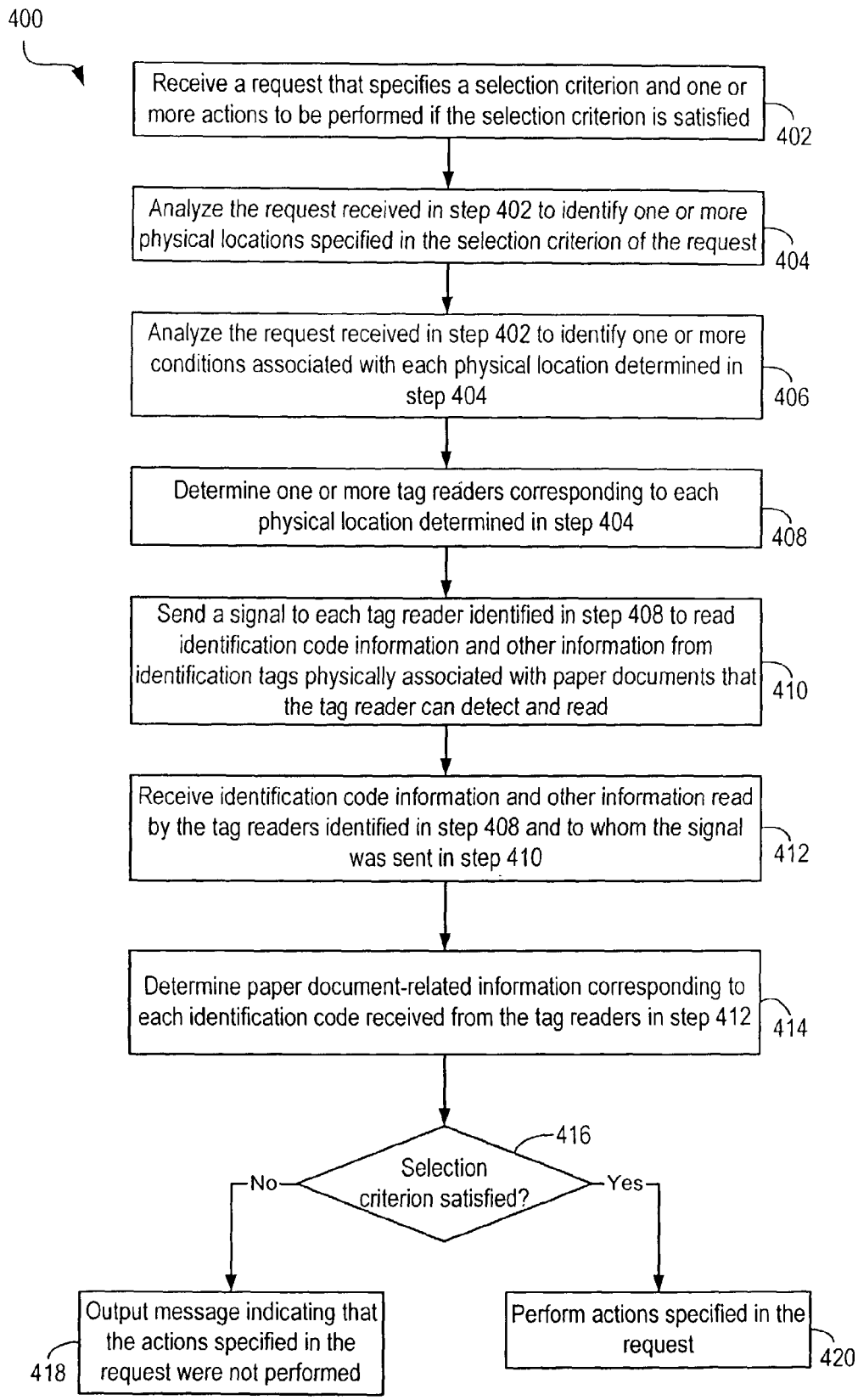
FIG. 4 is a simplified high-level flowchart depicting a method of processing a request that specifies selection criteria and one or more actions to be performed if the selection criterion is satisfied according to an embodiment of the present invention.

FIG. 4 is a simplified high-level flowchart 400 depicting a method of processing a request that specifies selection criteria and one or more actions to be performed if the selection criterion is satisfied according to an embodiment of the present invention. The method may be performed by data processing system 208, or by data processing system 208 in association with devices 204 or in association with other data processing systems. For example, the method may be performed by software modules executed by processor(s) of data processing system 208, or by hardware modules coupled to data processing system 208, or combinations thereof. Flowchart 400 depicted in FIG. 4 is merely illustrative of an embodiment incorporating the present invention and does not limit the scope of the invention as recited in the claims. One of ordinary skill in the art would recognize variations, modifications, and alternatives.

As depicted in FIG. 4, processing is initiated when data processing system 208 receives a request that specifies a selection criterion and one or more actions to be performed if the selection criterion is satisfied (step 402). The request may be received from various sources. For example, the request may be received from user system 206 or may be configured by a user interacting with data processing system 208.

According to an embodiment of the present invention, the selection criterion includes information identifying one or more physical locations and one or more conditions associated with each physical location. The one or more actions specified in the request are performed based upon the extent to which the conditions associated with the specified physical locations are satisfied. Various different notations and techniques known to those skilled in the art may be used to specify the selection criteria and actions.

Examples of requests include:
(1) (selection criterion) Phy. Loc.+Condition: If Paper document "doc1" is located in John's in-box container, (action) fax document "doc1" to Mary;
(2) (selection criterion) Phy. Loc.+Condition: If paper document "doc1" is located in John's in-box container, (action) send an email to Mary indicating that "doc1" is in John's in-box;
(3) (selection criterion) Phy. Loc.+Condition: If John's office contains a document titled "Project Plans for 2002",
(action) print a copy of the document;
(4) (selection criterion) Phy. Loc. #1+Condition #1: If document "doc1" is located in John's in-box, AND Phy. Loc. #2+Condition #1: document "doc2" is located in Mary's office,
(action) send an email to David;
and other like requests.

Data processing system 208 analyzes the request received in step 402 to identify one or more physical locations specified in the selection criterion of the request (step 404). Various different processing techniques known to those skilled in the art may be used to analyze the request to identify one or more physical locations specified in the request.

Data processing system 208 then analyzes the request received in step 402 to identify one or more conditions associated with each physical location determined in step 404 (step 406). Various different processing techniques known to those skilled in the art may be used to analyze the request to identify one or more conditions associated with each physical location specified in the request.

Data processing system 208 then determines one or more tag readers corresponding to each physical location determined in step 404 (step 408). According to an embodiment of the present invention, data processing system 208 uses the tag reader location information to determine one or more tag readers corresponding to the user-specified physical locations. For example, if the user-specified physical location is "John's in-box", then data processing system 208 uses the tag reader location information to identify one or more tag readers corresponding to or located proximal to John's in-box.

As previously described, a user may also specify a physical location by selecting one or more tag readers. In this scenario step 408 may not be performed.

Data processing system 208 then sends a signal to each tag reader identified in step 408 to read identification code information and other information from identification tags physically associated with paper documents that the tag reader can detect and read (step 410). As described above, if a particular tag reader identified in step 304 is able to read an identification code from an identification tag associated with a particular paper document, it indicates that the particular paper document is physically located proximal to the tag reader.

Data processing system 208 then receives identification code information and other information read by the tag readers identified in step 408 and to whom the signal was sent in step 410 (step 412). In alternative embodiments of the present invention, the tag readers may be configured to forward information read from the identification tags to data processing system 208 at periodic time intervals. In these embodiments, step 410 may be omitted.

Data processing system 208 then determines, based upon information in the paper document tracking database, paper document-related information corresponding to each identification code received from the tag readers in step 412 (step 414). As previously described, the paper document-related information corresponding to an identification code may comprise (or store a pointer to) a representation of the contents of the particular paper document (e.g., scanned images of the paper document, electronic document corresponding to the paper document), information identifying the paper document (e.g., title of the paper document, etc.), information identifying an electronic representation of the paper document (e.g., a filename, directory location, etc.), and the like. The paper document-related information may also include information identifying another document related to the paper document.

In alternative embodiments of the present invention, if the paper document-related information is stored in identification tags, the paper document-related information for an identification code may be read by one or more tag readers identified in step 408 and may be received along with the identification code information in step 412. In this scenario, there is no need to access the paper document tracking database to determine paper document-related information.

Based upon the information determined in step 414 (or information received in step 412), data processing system 208 determines if the selection criterion specified in the request received in step 402 is satisfied (step 416). According to an embodiment of the present invention, in step 416, data processing system 208 determines if the one or more conditions (identified in step 406) associated with each physical location determined in step 404 are satisfied. Various types of processing may be used to determine if the conditions associated with the physical locations are satisfied. For example, if a condition involves determining a characteristic (e.g., title) of a document (e.g., If John's office contains a document titled "Project Plans for 2002) and the paper document-related information determined in step 414 includes a scanned image of the paper document, then image processing techniques may be applied to the scanned image to determine the characteristic (e.g., title) of the paper document. Data processing system 208 may then determine if the condition is satisfied. Various other types of processing may also be performed.

Conditions involving the physical presence of a paper document in a particular physical location (e.g., if paper document "doc" is located in John's in-box) may be evaluated by determining if a tag reader corresponding to the physical location was able to read identification code corresponding to the particular paper document. In addition to the identification code information, the paper document-related information related to the identification code may be used to determine the identity of the paper document. If none of the tag readers corresponding to the physical location were able to read identification code corresponding to the particular paper document, then the condition is deemed not to be satisfied (i.e., the specified document could not be located at the specified physical location).

Whether or not the one or more actions specified in the request received in step 402 are performed depends upon the extent to which the selection criterion is deemed satisfied. If the selection criterion comprises Boolean connectors that used to connect the various conditions associated with one or more physical locations, then Boolean logic may be used to determine if the action specified by the request is to be performed.

If it is determined in step 416 that the selection criteria is not satisfied, then a message may be output to the user indicating that the one or more actions specified in the request were not performed (step 418). Information identifying one or more reasons for not performing the actions may also be output to the user in step 418.

If it is determined in step 416 that the selection criterion has been satisfied, then the one or more actions specified in the request are performed (step 420). The actions may be performed using information determined in step 414 or using other information. For example, for the example request "If Paper document "doc1" is located in John's in-box container, fax document "doc1" to Mary", "doc1" is faxed to Mary if paper document "doc1" is located in John's in-box container. The actions may be performed by data processing system 208, by devices 204 coupled to data processing system 208, by data processing system 208 in collaboration with one or more devices 204, or by other data processing systems or devices.

As described above, information identifying the actions performed may be stored in paper document tracking database or in identification tags that are physically associate with paper documents identified by identification code received in step 412.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method comprising:
   receiving, by a computer system, a first request comprising information identifying a first physical location and a first action to be performed;
   determining, by the computer system, a set of tag readers located at the first physical location, the determining being based on tag reader location information that includes associations between a plurality of tag readers and a plurality of physical locations;
   transmitting, by the computer system in response to the first request, a second request to the set of tag readers comprising a request to read information from identification tags physically associated with one or more paper documents located proximal to the set of tag readers;
   receiving, by the computer system, information read from the identification tags in response to the second request;
   determining, by the computer system for each paper document in the one or more paper documents, paper document-related information for the paper document based upon information read from the identification tag physically associated with the paper document;
   performing, by the computer system, the first action using the paper document-related information corresponding to at least one paper document in the one or more paper documents;
   upon completion of performing the first action, storing, by the computer system for each paper document in the at least one or more paper documents, information in a document history associated with the paper document, the information indicating that the first action has been performed for the paper document, wherein the document history associated with each paper document provides a record of document-related actions that have been performed for the paper document, wherein a copy of the document history is stored in the identification tag associated with the paper document, and wherein the copy of the document history may be accessed by transmitting a request to the identification tag.

2. The method of claim 1 wherein, for at least one paper document in the one or more paper documents, the identification tag is embedded in a page of the paper document.

3. The method of claim 1 wherein, for at least one paper document in the one or more paper documents, the identification tag is attached to the paper document.

4. The method of claim 3 wherein the identification tag is attached to a staple that is attached to the at least one paper document.

5. The method of claim 1 wherein determining the paper document-related information corresponding to each paper document in the one or more paper documents comprises:
   determining an identification code for each paper document from the information read from the identification tag physically associated with the paper document; and
   determining paper document-related information for each paper document based upon the identification code for the paper document.

6. The method of claim 5 wherein determining paper document-related information for each paper document based upon the identification code comprises:
   accessing first information identifying a plurality of identification codes and paper document-related information associated with each identification code; and
   determining for each paper document, from the first information, paper document-related information associated with an identification code that matches the identification code read from the identification tag physically associated with the paper document.

7. The method of claim 1 wherein performing the first action comprises printing a portion of the paper document-related information corresponding to the at least one paper document.

8. The method of claim 1 wherein performing the first action comprises photocopying a portion of the paper document-related information corresponding to the at least one paper document.

9. The method of claim 1 wherein performing the first action comprises faxing a portion of the paper document-related information corresponding to the at least one paper document.

10. The method of claim 1 wherein performing the first action comprises emailing a portion of the paper document-related information corresponding to the at least one paper document.

11. The method of claim 1 wherein the paper document-related information for the at least one paper document is included in the information read from identification tags physically associated with the one or more paper documents.

12. A method comprising:
  receiving, by a computer system, a first request comprising information specifying a physical location, a condition associated with the physical location, and an action to be performed if the condition associated with the physical location is satisfied;
  determining, by the computer system, a set of tag readers located at the physical location, the determining being based on tag reader location information that includes associations between a plurality of tag readers and a plurality of physical locations;
  transmitting, by the computer system in response to the first request, a second request to the set of tag readers comprising a request to read information from identification tags physically associated with one or more paper documents located proximal to the set of tag readers;
  receiving, by the computer system, information read from the identification tags in response to the second request;
  determining, by the computer system, if the condition associated with the physical location is satisfied based upon the information read from the identification tags;
  performing, by the computer system, the action if the condition associated with the physical location is satisfied; and
  upon completion of performing the action, storing, by the computer system for each paper document in the one or more paper documents, information in a document history associated with the paper document, the information indicating that the action has been performed for the paper document, wherein the document history associated with each paper document provides a record of document-related actions that have been performed for the paper document, wherein a copy of the document history is stored in the identification tag associated with the paper document, and wherein the copy of the document history may be accessed by transmitting a request to the identification tag.

13. The method of claim 12 wherein:
  the condition associated with the physical location is satisfied if a first paper document is located at the physical location; and
  determining if the condition associated with the physical location is satisfied comprises determining if the first paper document is included in the one or more paper documents.

14. The method of claim 12 wherein determining if the condition associated with the physical location is satisfied comprises:
  for each paper document in the one or more paper documents, determining an identification code for the paper document from the information read from the identification tags;
  for each paper document in the one or more paper documents, determining paper document-related information for the paper document based upon the identification code for the paper document; and
  determining if the condition associated with the physical location is satisfied based upon the paper document-related information determined for the one or more paper documents.

15. The method of claim 14 wherein performing the action comprises performing the action using paper document-related information for at least one paper document in the one or more paper documents.

16. The method of claim 12 wherein:
  the condition associated with the physical location is satisfied if a paper document having a first characteristic is located at the physical location; and
  determining if the condition associated with the physical location is satisfied comprises determining if the one or more paper documents includes at least one paper document having the first characteristic.

17. A system comprising:
  a plurality of tag readers; and
  a data processing system coupled to the plurality of tag readers;
  wherein the data processing system includes at least once processor;
  wherein the data processing system is configured to receive a first request comprising information identifying a first physical location and a first action to be performed;
  wherein the data processing system is configured to determine a set of tag readers located at the first physical location, the determining being based on tag reader location information that includes associations between the plurality of tag readers and a plurality of physical locations;
  wherein the data processing system is configured to transmit, in response to the first request, a second request to the set of tag readers comprising a request to read information from identification tags physically associated with one or more paper documents located proximal to the set of tag readers;
  wherein the set of tag readers is configured to read information from the identification tags and to communicate the information read from the identification tags to the data processing system in response to the second request;
  wherein the data processing system is configured to, for each paper document in the one or more paper documents, determine paper document-related information corresponding to the paper document based upon information read from the identification tag physically associated with the paper document; and
  wherein the data processing system is configured to perform the first action using the paper document-related information corresponding to at least one paper document in the one or more paper documents; and
  wherein the data processing system is further configured to upon completion of the first action, store, for each paper document in the at least one or more paper documents, information in a document history associated with the paper document, the information indicating that the first action has been performed for the paper document, wherein the document history associated with each paper document provides a record of document-related actions that have been performed for the paper document, wherein a copy of the document history is stored in the identification tag associated with the paper document, and wherein the copy of the document history may be accessed by transmitting a request to the identification tag.

18. The system of claim 17 wherein, for at least one paper document in the one or more paper documents, the identification tag is embedded in a page of the paper document.

19. The system of claim 17 wherein, for at least one paper document in the one or more paper documents, the identification tag is attached to the paper document.

20. The system of claim 19 wherein the identification tag is attached to a staple that is attached to the at least one paper document.

21. The system of claim 17 wherein the data processing system is configured to determine paper document-related information for each paper document in the one or more paper documents by:
  determining an identification code for each paper document in the one or more paper documents from the information read from the identification tag physically associated with the paper document; and
  determining paper document-related information for each paper document based upon the identification code for the paper document.

22. The system of claim 17 wherein the first action performed by the data processing system comprises at least one of printing a portion of the paper document-related information corresponding to the at least one paper document, photocopying a portion of the paper document-related information corresponding to the at least one paper document, faxing a portion of the paper document-related information corresponding to the at least one paper document, and emailing a portion of the paper document-related information corresponding to the at least one paper document.

23. The system of claim 17 wherein the paper document-related information for the at least one paper document is included in the information read from identification tags physically associated with the one or more paper documents.

24. A system comprising:
  a plurality of tag readers; and
  a data processing system coupled to the plurality of tag readers;
  wherein the data processing system includes at least once processor;
  wherein the data processing system is configured to receive a first request comprising information specifying a physical location, a condition associated with the physical location, and an action to be performed if the condition associated with the physical location is satisfied;
  wherein the data processing system is configured to determine a set of tag readers located at the physical location, the determining being based on tag reader location information that includes associations between the plurality of tag readers and a plurality of physical locations;
  wherein the data processing system is configured to transmit, in response to the first request, a second request to the set of tag readers comprising a request for the set of tag readers to read information from identification tags physically associated with one or more paper documents located proximal to the set of tag readers;
  wherein one or more tag readers from the set of tag readers are configured to read information from the identification tags and to communicate the information read from the identification tags to the data processing system;
  wherein the data processing system is configured to determine if the condition associated with the physical location is satisfied based upon the information read from the identification tags, and to perform the action if the condition associated with the physical location is satisfied; and
  wherein the data processing system is further configured to upon completion of the action, store, for each paper document of the one or more paper documents, information in a document history associated with the paper document, the information indicating that the action has been performed for the paper document, wherein the document history associated with each paper document provides a record of document-related actions that have been performed for the paper document, wherein a copy of the document history is stored in the identification tag associated with the paper document, and wherein the copy of the document history may be accessed by transmitting a request to the identification tag.

25. The system of claim 24 wherein:
  the condition associated with the physical location is satisfied if a first paper document is located at the physical location; and
  the data processing system is configured to determine if the first paper document is included in the one or more paper documents.

26. The system of claim 24 wherein the data processing system is configured to:
  for each paper document in the one or more paper documents, determine an identification code for the paper document from the information read from the identification tags;
  for each paper document in the one or more paper documents, determine paper document-related information for the paper document based upon the identification code for the paper document; and
  determine if the condition associated with the physical location is satisfied based upon the paper document-related information determined for the one or more paper documents.

27. The system of claim 26 wherein the data processing system is configured to perform the action using paper document-related information for at least one paper document in the one or more paper documents.

28. The system of claim 24 wherein:
  the condition associated with the physical location is satisfied if a paper document having a first characteristic is located at the physical location; and
  the data processing system is configured to determine if the one or more paper documents includes at least one paper document having the first characteristic.

29. A non-transitory computer-readable storage medium storing a computer program executable by a processor, the computer program comprising:
  code for receiving a first request comprising information identifying a first physical location and a first action to be performed;
  code for determining a set of tag readers located at the first physical location, the determining being based on tag reader location information that includes associations between a plurality of tai readers and a plurality of physical locations;
  code for transmitting, in response to the first request, a second request to the set of tag readers comprising a request to read information from identification tags physically associated with one or more paper documents located proximal to the set of tag readers;
  code for receiving information read from the identification tags in response to the second request;
  code for determining, for each paper document in the one or more paper documents, paper document-related information for the paper document based upon information read from the identification tag physically associated with the paper document;
  code for performing the first action using the paper document-related information corresponding to at least one paper document in the one or more paper documents; and
  code for storing, for each paper document in the at least one or more paper documents, information in a document history associated with the paper document upon completion of performing the first action, the information indicating that the first action has been performed for the paper document, wherein the document history associated with each paper document provides a record of document-related actions that have been performed for the paper document, wherein a copy of the document history is stored in the identification tag associated with the paper document, and wherein the copy of the document history may be accessed by transmitting a request to the identification tag.

30. The non-transitory computer-readable storage medium of claim 29 wherein the code for determining the paper document-related information corresponding to each paper document in the one or more paper documents comprises:
  code for determining an identification code for each paper document from the information read from the identification tag physically associated with the paper document; and
  code for determining paper document-related information for each paper document based upon the identification code for the paper document.

31. The non-transitory computer-readable storage medium of claim 29 wherein the code for performing the first action comprises at least one of code for printing a portion of the paper document-related information corresponding to the at least one paper document, code for photocopying a portion of the paper document-related information corresponding to the at least one paper document, code for faxing a portion of the paper document-related information corresponding to the at least one paper document, and code for emailing a portion of the paper document-related information corresponding to the at least one paper document.

32. The non-transitory computer-readable storage medium of claim 29 wherein the paper document-related information for the at least one paper document is included in the information read from identification tags physically associated with the one or more paper documents.

33. A non-transitory computer-readable storage medium storing a computer program executable by a processor, the computer program comprising:
  code for receiving a first request comprising information specifying a physical location, a condition associated with the physical location, and an action to be performed if the condition associated with the physical location is satisfied;
  code for determining a set of tag readers located at the physical location, the determining being based on tag reader location information that includes associations between a plurality of tag readers and a plurality of physical locations;
  code for transmitting, in response to the first request, a second request to the set of tag readers comprising a request to read information from identification tags physically associated with one or more paper documents located proximal to the set of tag readers;
  code for receiving information read from the identification tags in response to the second request;
  code for determining if the condition associated with the physical location is satisfied based upon the information read from the identification tags; and
  code for performing the action if the condition associated with the physical location is satisfied; and
  code for storing, for each paper document in the one or more paper documents, information in a document history associated with the paper document upon completion of performing the action, the information indicating that the action has been performed for the paper document, wherein the document history associated with each paper document provides a record of document-related actions that have been performed for the paper document, wherein a copy of the document history is stored in the identification tag associated with the paper document, and wherein the copy of the document history may be accessed by transmitting a request to the identification tag.

34. The non-transitory computer-readable storage medium of claim 33 wherein:
  the condition associated with the physical location is satisfied if a first paper document is located at the physical location; and
  the code for determining if the condition associated with the physical location is satisfied comprises code for determining if the first paper document is included in the one or more paper documents.

35. The non-transitory computer-readable storage medium of claim 33 wherein the code for determining if the condition associated with the physical location is satisfied comprises:
  for each paper document in the one or more paper documents, code for determining an identification code for the paper document from the information read from the identification tags;
  for each paper document in the one or more paper documents, code for determining paper document-related information for the paper document based upon the identification code for the paper document; and
  code for determining if the condition associated with the physical location is satisfied based upon the paper document-related information determined for the one or more paper documents.

36. The non-transitory computer-readable storage medium of claim 35 wherein the code for performing the action comprises code for performing the action using paper document-related information for at least one paper document in the one or more paper documents.

37. The non-transitory computer-readable storage medium of claim 33 wherein:
  the condition associated with the physical location is satisfied if a paper document having a first characteristic is located at the physical location; and
  the code for determining if the condition associated with the physical location is satisfied comprises code for determining if the one or more paper documents includes at least one paper document having the first characteristic.

38. A system comprising:
  means for receiving a first request comprising information identifying a first physical location and a first action to be performed;
  means for determining a set of tag readers located at the first physical location, the determining being based on tag reader location information that includes associations between a plurality of tag readers and a plurality of physical locations;
  means for transmitting, in response to the first request, a second request to the set of tag readers comprising a request to read information from identification tags physically associated with one or more paper documents located proximal to the set of tag readers;
  means for receiving information read from the identification tags in response to the second request;
  means for determining, for each paper document in the one or more paper documents, paper document-related information for the paper document based upon information read from the identification tag physically associated with the paper document; and means for performing the first action using the paper document-related information corresponding to at least one paper document in the one or more paper documents; and means for storing, for each paper document in the at least one or more paper documents, information in a document history associated with the paper document upon completion of performing the first action, the information indicating that the first action has been performed for the paper document, wherein the document history associated with each paper document provides a record of document-related actions that have been performed for the paper document, wherein a copy of the document history is stored in the identification tag associated with the paper document, and wherein the copy of the document history may be accessed by transmitting a request to the identification tag.

39. A system comprising:

means for receiving a first request comprising information specifying a physical location, a condition associated with the physical location, and an action to be performed if the condition associated with the physical location is satisfied;

means for determining a set of tag readers located at the physical location, the determining being based on tag reader location information that includes associations between a plurality of tai readers and a plurality of physical locations;

means for transmitting, in response to the first request, a second request to the set of tag readers comprising a request to read information from identification tags physically associated with one or more paper documents located proximal to the set of tag readers;

means for receiving information read from the identification tags in response to the second request;

means for determining if the condition associated with the physical location is satisfied based upon the information read from the identification tags;

means for performing the action if the condition associated with the physical location is satisfied; and means for storing, for each paper document in the one or more paper documents, information in a document history associated with the paper document upon completion of performing the action, the information indicating that the action has been performed for the paper document, wherein the document history associated with each paper document provides a record of document-related actions that have been performed for the paper document, wherein a copy of the document history is stored in the identification tag associated with the paper document, and wherein the copy of the document history may be accessed by transmitting a request to the identification tag.

* * * * *